Jan. 24, 1950  M. BERLIN  2,495,221
METHOD OF MAKING CUTTING DIES
Original Filed Aug. 4, 1945  4 Sheets-Sheet 1

INVENTOR
MILTON BERLIN
BY Wade Koontz
ATTORNEYS

INVENTOR
MILTON BERLIN

Jan. 24, 1950      M. BERLIN      2,495,221
METHOD OF MAKING CUTTING DIES
Original Filed Aug. 4, 1945      4 Sheets-Sheet 3
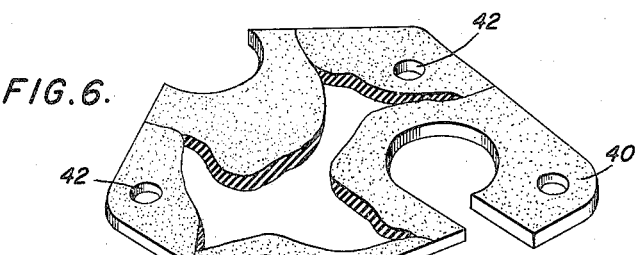
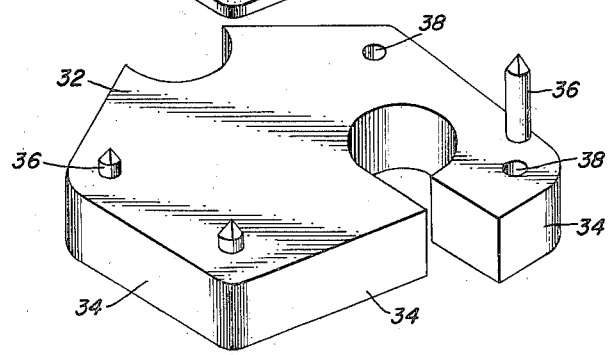
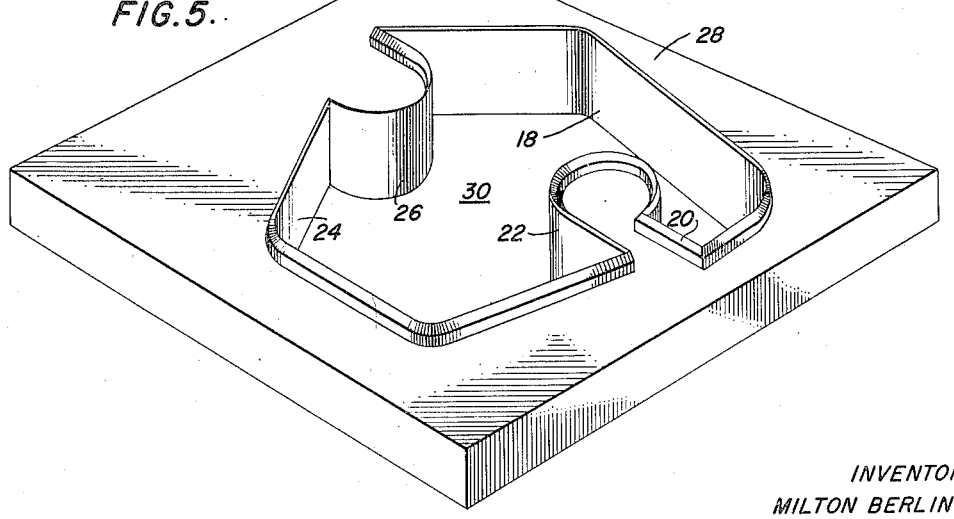
INVENTOR
MILTON BERLIN
BY
ATTORNEYS Jan. 24, 1950     M. BERLIN     2,495,221
METHOD OF MAKING CUTTING DIES
Original Filed Aug. 4, 1945     4 Sheets-Sheet 4
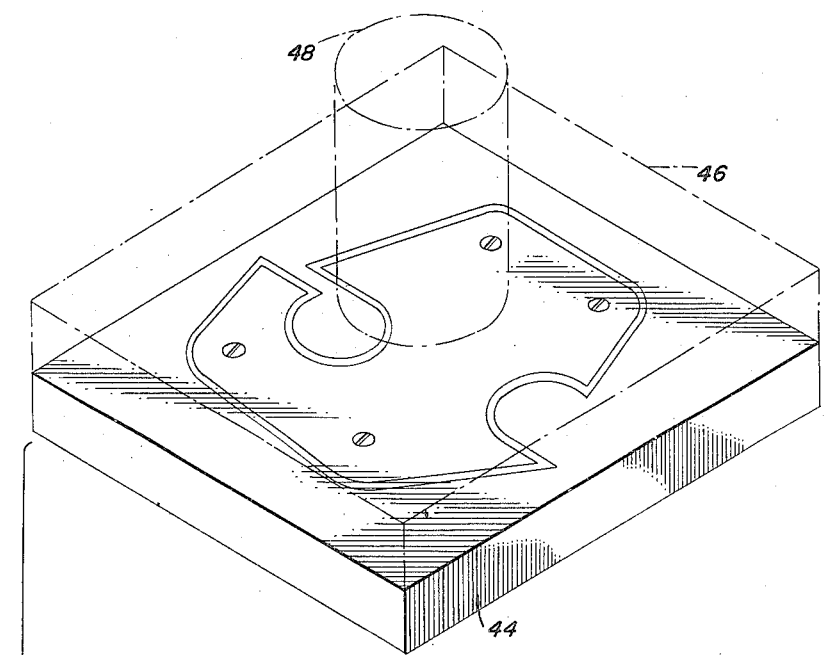
FIG.8.
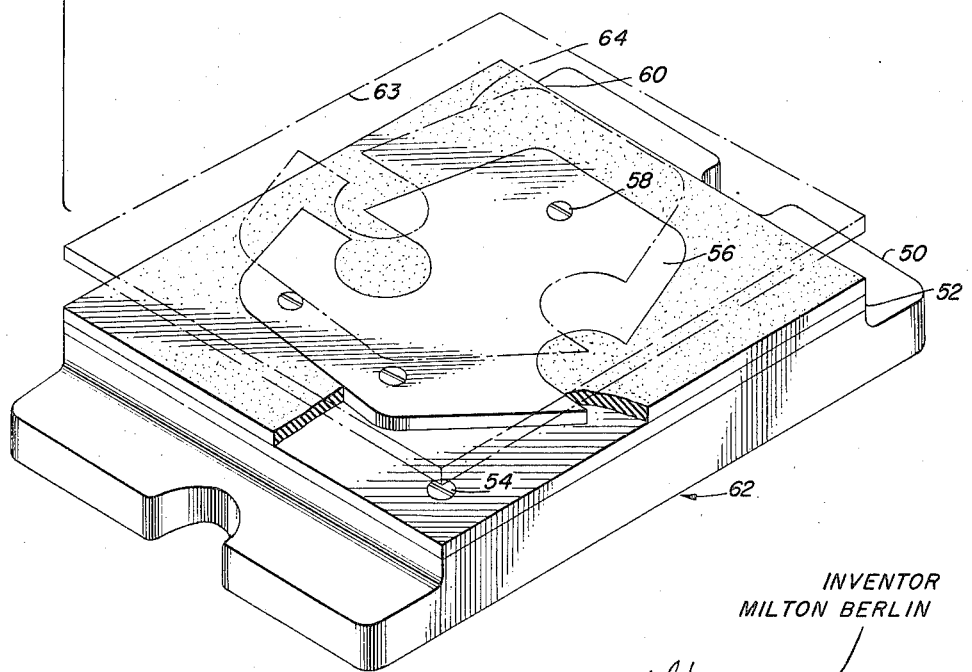
INVENTOR
MILTON BERLIN
BY *Wade Koontz*
ATTORNEYS Patented Jan. 24, 1950

2,495,221

UNITED STATES PATENT OFFICE 2,495,221

METHOD OF MAKING CUTTING DIES

Milton Berlin, Brooklyn, N. Y.

Original application August 4, 1945, Serial No. 609,006. Divided and this application August 20, 1946, Serial No. 691,675

1 Claim. (Cl. 76—107)

(Granted under the act of March 3, 1883, as amended April 30, 1928; 370 O. G. 757)

The invention described herein may be manufactured and used by or for the Government for governmental purposes without the payment to me of any royalty thereon.

This invention is a division of my copending application Serial No. 609,006 filed August 4, 1945, and relates to a method of making cutting dies for sheet material parts and is particularly economical when producing a limited number of punchings of irregular outline.

An object of the invention is to provide a cutting die and a method of making it, the relatively low cost of which may be justified even when the number of parts is quite limited if the stock from which the punchings are to be made is not too hard.

Another object is to provide a cutting die of this character which may be made from commercially procurable stock which is less expensive and easier to work than is employed in the art as now practiced.

Other objects and advantages will be evident as the invention is further described and reference is made to the drawings, wherein:

Fig. 4 shows a second block which is adapted to fit the inside contour of the assembled parts of Fig. 2 to hold them positioned.

Fig. 5 shows the supporting block of Fig. 3 with the parts of Fig. 2 assembled therein.

Fig. 6 shows a stripper adapted to remove the punching from the die.

Fig. 8 shows the assembly of Fig. 7 mounted on the underside of a punch block, and the cutting plate on the upper side of the die with a piece of stock between the two.

Figure 1:
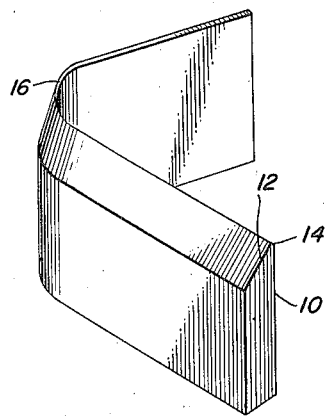
Fig. 1 shows a length of steel-rule stock with beveled edges, bent somewhat in the manner of the parts of the die.

The several views are all drawn in perspective.

Like reference characters refer to like parts throughout the several views.

As is not unusual in conformed die design the die proper is mounted on the upper or punch block while the punch proper is mounted on the lower or die block. To avoid confusion, therefore, the several elements will be designated accordingly.

Referring to the drawings, a length of commercially procurable steel-rule stock 10, Fig. 1, has a forty-five degree bevel 12 on one side which extends across approximately eighty-five percent of the thickness of the stock, and a bevel 14 of equal angle on the other side extending across the remaining fifteen percent of the thickness. Lengths of the steel-rule stock are bent as at 16 to conform to the perimeter of the punching which is to be produced, the side having the narrow bevel 14 being in all cases placed next the model or other outline of the desired punching. Whether one piece or a plurality of pieces of the rule stock are used to encompass the punching, depends somewhat on the size as well as the complexity of the outline.

Figure 2:
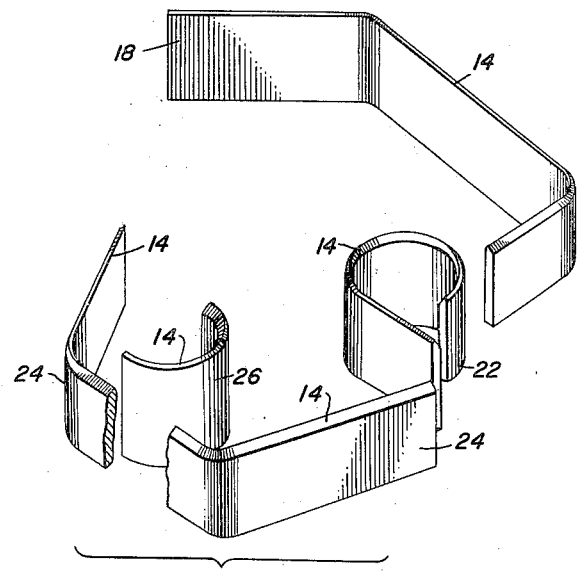
Fig. 2 shows a series of bent blades or pieces of steel-rule stock which, when put together, form the outline of the desired punching die.
Figure 3:
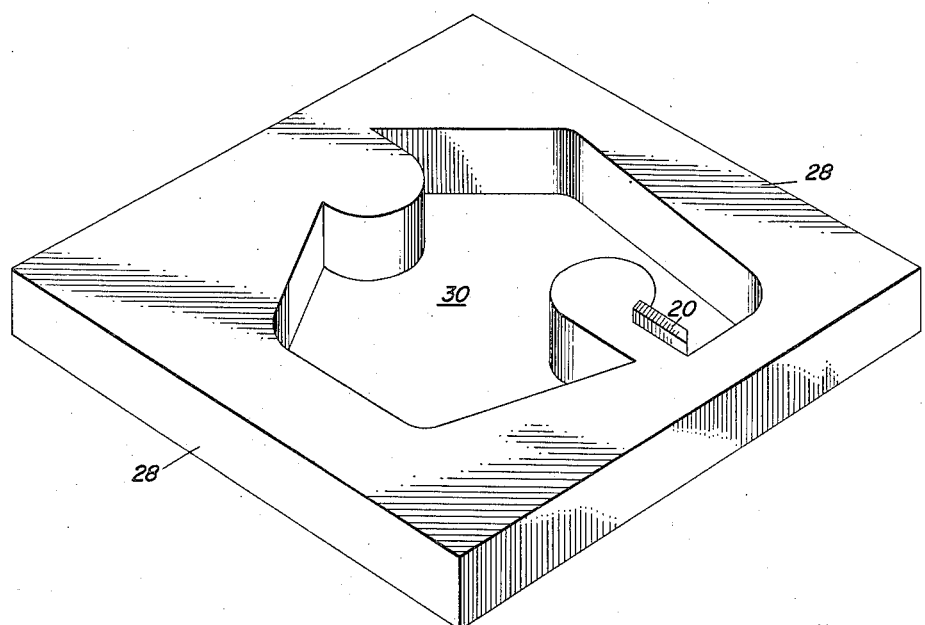
Fig. 3 shows a block adapted to surround the pieces shown in Fig. 2 and hold them properly positioned in the die.

Fig. 2 shows how a number of pieces 18, 20, 22, 24 and 26 of rule-stock 10 are bent to form cutting blades, the side having the narrow bevel 14 being fitted up to the perimeter of the punching. A block 28, Fig. 3, which may be hard plywood or other material which is not too difficult to work, has an opening 30, the outline of which is duplicative of the desired punching but larger all around by the thickness of the rule-stock.

A block 32, Fig. 4, of similar material is formed to an outline 34 which is the exact outline of the desired punching. When all of the cutting blades 18, 20, 22, 24 and 26, Fig. 2, are assembled around the inner periphery of the opening 30 as shown in Fig. 5, the block 32, Fig. 4, may be pressed into the opening 30, the opening 30 being so fitted that the block 32 may be forced into place inside the cutting blades only with considerable pressure. Blocks 28 and 32 are both preferably of a thickness which will allow the cutting blades 18, 20, 22 etc. to extend above the blocks a distance about equal to the thickness of the blades.

If it is desired to mark the punching for subsequent drilling, a series of center punches 36 may be inserted in holes 38 in the block 32, or the desired holes may be had by substituting small flat ended punches instead of the center punches, if corresponding die holes are provided in the appropriate member.

Figure 7:
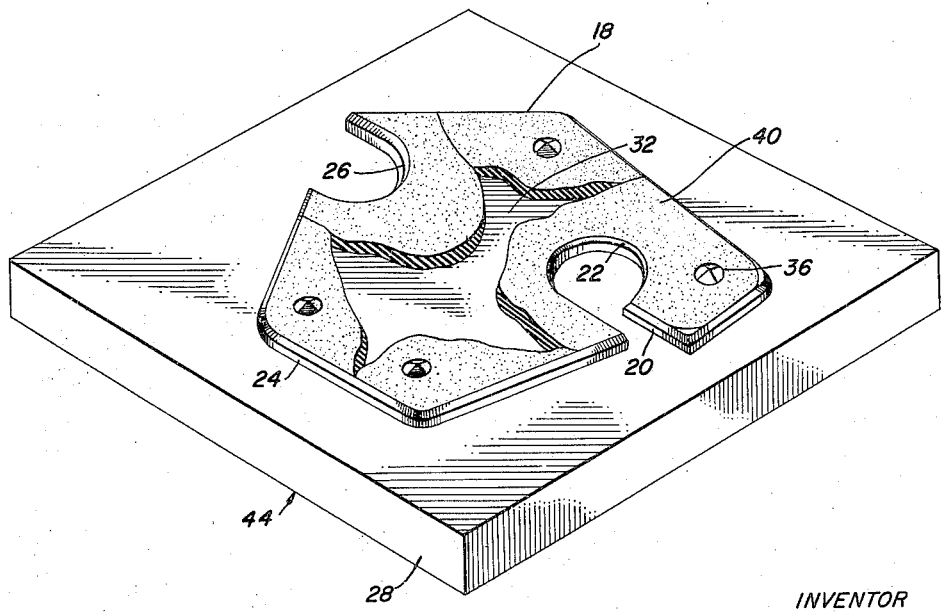
Fig. 7 is an assembly of the supporting blocks of Figs. 3 and 4 with the cutting parts of Fig. 2 assembled therein and the stripper of Fig. 6 in place.

When the block 32 has been forced into place in the opening 30 as above described, a stripper 40, Fig. 6, of sheet rubber, which is of a thickness about equal to the distance which the blades 18, 20, 22 etc. extend above the blocks 28 and 32, is secured to the top of the block 32 as shown in Fig. 7. The stripper 40 may, if desired, consist of a single piece, or, where the punching to be produced is of relatively large dimensions, rubber may be conserved by making the stripper in a number of smaller pieces as shown in Fig. 6. In either event holes 42 should be provided in the rubber to clear the center punches 36. The entire assembly shown in Fig. 7 may be referred to as the punching die and be broadly designated by the numeral 44.

The die assembly 44 is now turned top side down as in Fig. 8, and secured to the underside of a conventional punch block 46 which is usually provided with a shank 48 adapted to be held by suitable clamping means on the lower end of the press ram. The structure hereinbefore described completes the movable member of the device.

A conventional die block 50 (see Fig. 8) is preferably first faced with a steel base plate 52 which may be fastened on the block by means of screws 54. A cutting plate 56 of suitable die stock is secured to the block 50 and to the base plate 52 by screws 58. This cutting plate should at this time be of any size which is enough larger than the desired punching to leave a small margin all around it.

The shank 48 of the punch block 46 is now clamped to the ram of a suitable punch press, and the die block 50 roughly aligned with the assembly 44 and clamped to the bolster of the press. The press ram may then be brought down and adjusted so that, on the down stroke of the ram, the sharp edges of the cutting blades 18, 20, 22 etc. will be pressed deep enough in the cutting plate 56, which is at this stage of larger outline than the desired punching, to mark off the exact outline of the punching on the cutting plate 56. The cutting plate 56 is then removed from the die block 50 and base plate 52 by removing the screws 58, and the cutting plate 56 is cut down to the exact size and outline of the punching by following the outline cut into it by the sharp edges of the cutting blades 18, 20, 22 etc. The cutting plate 56 corresponds to that which is the punch in a sample punch and die, and may hereinafter be referred to as the punch or punch plate.

After the punch or punch plate 56 is returned to position on the die block 50 and fastened by screws 58, a rubber stripper 60 preferably made of sheet rubber of substantially the same thickness as the punch plate 56 is cut out to fit around the punch plate outline and fastened to the punch 52 as shown in Fig. 8. The stripper 60 may be made in a single piece as shown, or may be made in sections where the punching is of considerable size. The die block assembly which includes the punch plate may be broadly referred to by the numeral 62.

While in the drawings the die assembly 44 is attached to the punch block which is the upper or movable part of the device, and the assembly 62 which includes the punch plate 56 is attached to the bolster, which is the stationary part of the device, the arrangement may readily be reversed whereby the assembly 62 will be above and the assembly 44 below, and while steel rule stock is indicated as being preferred, any suitable strip steel of proper width and thickness may be substituted if desired.

In practice stampings 63 from sheet metal stock 64 can be quickly and nicely made by inserting the stock between the punch block 46 bearing the die 44 and the die block 50 bearing the steel plate 52 and plate 56, both parts of the apparatus being supported in the proper operative positions. When the punch block is forced against the sheet metal stock, the steel blades of the punching die 44 shear through the metal along the edges of the cutting plate 56, and a sheet punching of the desired configuration is at once obtained, because the stock is cut through along the edges of the punching plate 56 cleanly and smoothly.

It is a novel feature of great importance that the block 28 is of hard wood. When the piece 32 is cut out the block 28 affords a frame in which the parts having the cutting edges of the die are locked by the piece 32 as the latter is placed in the opening 30.

The value and merit of the invention reside in the fact that the apparatus as illustrated in Figures 7 and 8 can be made with less labor, inexpensively and quickly and will operate with the greatest efficiency and certainty to yield the desired results. The die block 50 is of metal and the base plate 52 is of steel, as usual, and the cutting plate 56 is also of suitable metal. When the metal punching die 44 comprising the steel blades in the blocks 28 and 32 is pressed against a plate of metal stock on the punching or cutting plate 56, a punching can be severed and cut free from the stock instantly, and repeated operations can be cleanly performed with the full pressure needed. Any suitable hard wood can be utilized for the blocks 28 and 32; for example, maple, soft gum, plywood, etc. The opening 30 can be cut out by means of an ordinary scroll saw; and whereas such blocks have heretofore been of steel and required weeks for completion, a block of any of the woods mentioned can be completed in a few hours; and serves just as well and lasts just as long. Thus the production of the punching die takes only from one tenth to one hundredth of the time necessary to make the same member out of steel or other metal. The apparatus can cut out perfect punchings from dural metal of $\frac{3}{16}$ inch thickness and from cold rolled steel up to even a fourth of an inch. The assembly as shown in Figures 6 and 7 can thus be made in a very short time and in practice, the cutting plate 56 is of the same shape as the outline enclosed by the steel blades of the punching die 44, and of such a size that the edges of the punching block 56 lie preferably just within the compass of these blades, and virtually flush with the inner faces of these blades. Then as the punching die forces the metal stock against the punching block, the edges of the latter press against the stock on one face thereof while the cutting blades press against the stock on the other face. The shearing or punching action is thus clean and even and a perfect punching is always produced.

Having described an embodiment of my invention,

I claim:

A method of making a device for punching sheet metal which consists in cutting an opening in a die block having the contour of the desired punching but larger than the punching, bending blade means in strip form to make cutting edges and fitting them around the inside of the opening in the die block, pressing a smaller block of the same contour into the space enclosed by said blades, covering the smaller block within the contour enclosed by the blades with a resilient stripper block of the same thickness as the exposed height of the blades, fastening a punch plate to a base plate, pressing the cutting edges of the blades into the punch plate to mark off said contour thereon, removing the marked punch plate from the base plate, trimming the punch plate to the marked outline of said contour, returning and fastening the punch plate to the base plate, and surrounding said punch plate with cushioning stripper material on the base plate.

MILTON BERLIN.

REFERENCES CITED

The following references are of record in the file of this patent:

UNITED STATES PATENTS

| Number | Name | Date |
|---|---|---|
| 163,674 | McKenzie | May 25, 1875 |
| 1,650,314 | Ackermann | Nov. 22, 1927 |
| 1,701,545 | Shaw | Feb. 12, 1929 |
| 1,701,546 | Shaw | Feb. 12, 1929 |
| 1,701,547 | Shaw | Feb. 12, 1929 |
| 1,915,657 | Findlater | June 27, 1933 |
| 2,211,213 | Lindholm | Aug. 13, 1940 |
| 2,313,801 | Carll | Mar. 16, 1943 |
| 2,323,949 | Vosburg | July 13, 1943 |